United States Patent [19]
May

[11] Patent Number: 5,301,919
[45] Date of Patent: Apr. 12, 1994

[54] SPRINKLER VALVE

[76] Inventor: Gordon H. May, 3261 Woodleigh La., Cameron Park, Calif. 95682

[21] Appl. No.: 947,047

[22] Filed: Sep. 17, 1992

Related U.S. Application Data

[63] Continuation-in-part of Ser. No. 762,565, Sep. 18, 1991, Pat. No. 5,195,718.

[51] Int. Cl.⁵ .................... F16K 31/02; F16K 31/126
[52] U.S. Cl. ...................... 251/30.02; 251/34
[58] Field of Search ............... 251/30.01, 30.02, 30.05, 251/129.03, 33, 34

[56] References Cited

U.S. PATENT DOCUMENTS

| 833,307 | 10/1906 | Dake | 251/30.05 X |
|---|---|---|---|
| 3,090,592 | 5/1963 | Fleer | 251/30.01 |
| 4,108,419 | 8/1978 | Sturman et al. | 251/30.01 |
| 4,640,093 | 2/1987 | Eastman | 251/30.02 X |
| 4,981,280 | 1/1991 | Brandenberg | 251/30.02 X |
| 5,011,081 | 4/1991 | Bentley | 251/30.02 X |

FOREIGN PATENT DOCUMENTS

2066422 7/1981 United Kingdom ............. 251/30.05

*Primary Examiner*—Martin P. Schwadron
*Assistant Examiner*—Kevin L. Lee
*Attorney, Agent, or Firm*—Peter Peckarsky

[57] ABSTRACT

A sprinkler valve suitable for flows from about one (1) to two (2) gallons per hour to thirty (30) to forty (40) gallons per minute. A double diaphragm utilizes a principle of differential areas to create force for any non-zero pressure through the valve. This feature, in conjunction with momentary fluid flow in the solenoid circuit, is responsible for complete regulation of the flow characteristics of the valve. The requirement for large shut-off springs and flow control adjustment screws has been eliminated. The flow may be determined by the size of the valve. The need for solenoid springs has been eliminated. In one embodiment two (2) separate diaphragms utilize a principle of differential areas to create force for any non-zero pressure through the valve. This feature, in conjunction with momentary fluid flow in the solenoid circuit, is responsible for complete control of the flow characteristics of the valve. The requirement for large shut-off assist springs and solenoid return springs has been eliminated.

11 Claims, 8 Drawing Sheets

SPRINKLER VALVE

This is a continuation-in-part of Ser. No. 07/762,565 filed Sep. 18, 1991, now U.S. Pat. No. 5,195,718 issued on Mar. 23, 1993.

FIELD OF THE INVENTION

Generically, the invention relates to controlling any fluid flow (liquid or gas) in low flow rate systems used to distribute fluids. The specific embodiment of the invention discussed in the specification relates to applications for control valves to be used for watering plants, lawns, trees, and low flow drip irrigation systems.

BACKGROUND OF THE INVENTION

Because of requirements for water conservation, low flow drip systems have become an important means of watering plants and the like. These drip systems, along with home use applications, require flow rates down to one (1) or two (2) gallons per hour. Present 0.75. inch inlet port sprinkler valves are suitable for flow rates from five (5) gallons per minute up to thirty (30) to forty (40) gallons per minute. These present valves require flow control adjustment means, large compression shut-off springs, and solenoid return springs. The prior art devices balance fluid pressure on a single diaphragm against a variable spring force.

The prior art diaphragm closing springs and solenoid springs must be of sufficient strength to offset normal internal valve fluid pressures of 40 psi to 150 psi.

Further, fluid flows in the prior art solenoid circuits whenever the valve is in the "ON" state. This continual flow of fluid in the small orifices and passages of the prior art solenoid circuits may cause a problem if there is sediment in the fluid.

SUMMARY OF THE INVENTION

According to a first aspect of the invention, it is a purpose of this invention which operates without flow control adjusting screws, valve shut-off compression springs, and solenoid return springs to provide means to self-regulate fluid flows down to about one (1) gallon per hour and up to a maximum flow rate limited only by the size of the valve.

The invention provides for a differential force to keep the sprinkler valve closed which force is provided by the difference in areas between an upper diaphragm and a lower diaphragm. With a constant pressure applied to the upper and lower diaphragms of the invention and with a constant difference between the upper and lower diaphragms in the surface area exposed to the fluid, a constant force is produced.

The sprinkler valve of the invention described in this specification does not require springs to offset fluid pressures in the range of 40 psi to 150 psi.

Further, another purpose of this invention is to eliminate clogging of the small passages and orifices in the solenoid circuit. This unique improvement of eliminating clogging of the small passages and orifices in the solenoid circuit is accomplished since fluid flow in the solenoid circuit is momentary and only occurs during the shift from an "OFF" state to an "ON" state. In a sprinkler valve using the invention, the shift from an "OFF" state to an "ON" state may be accomplished either manually or by applying electrical current to the solenoid.

According to a second aspect of this invention, a purpose of this invention is to provide a valve which operates with and without flow control adjusting screws, valve shut-off compression springs, and solenoid return springs to provide means to self-regulate fluid flows down to about one (1) gallon per hour (or its equivalent in the case of a gaseous fluid flow) and up to a maximum flow rate limited only by the size of the valve.

The invention provides for a differential force to keep the sprinkler valve closed which force is provided by the difference in effective surface areas between an upper diaphragm and a lower diaphragm. For a constant pressure differential between the upper and lower diaphragms of the invention, a constant positive force is produced.

The sprinkler valve according to the second aspect of the invention described in this specification does not require solenoid springs to offset fluid pressures in the range of approximately 1 psi (and as low as the inlet pressure generated when fluid is barely dripping into the valve) to 150 psi.

Further, another purpose of this invention is to eliminate clogging of the small passages and orifices in the solenoid circuit. This unique improvement of eliminating clogging of the small passages and orifices in the solenoid circuit is accomplished since fluid flow in the solenoid circuit is momentary and only occurs during the shift from an "OFF" state to an "ON" state. In a sprinkler valve using the invention, the shift from an "OFF" state to an "ON" state may be accomplished either manually or by applying electrical current to the solenoid.

These and further operational and construction characteristics of the invention will be more evident from the detailed description given hereinafter with reference to the figures of the accompanying drawings which illustrate preferred embodiments by way of non-limiting examples.

DETAILED DESCRIPTION OF THE DISCLOSURE

Figure 1:
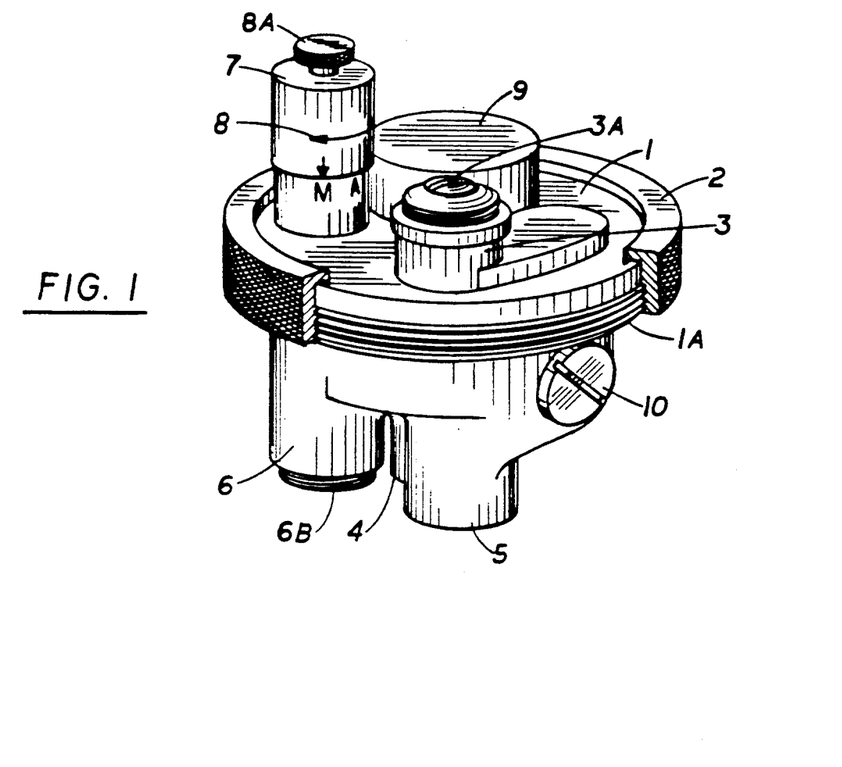
FIG. 1 shows a perspective view of the sprinkler valve.

FIG. 1 shows a perspective view of a sprinkler valve. This embodiment, though not limited in size or shape, shows an upper body shell 1, a lower body shell 1A, and a screw-on clamp ring 2 which clamps the upper body shell 1 to the lower body shell 1A. Appropriate "O" rings or sealing means are employed to insure fluid flows are contained in their respective channels. A well-known anti-siphon valve chamber 3 can, if not required, be fitted with a cap 3A. Said cap 3A eliminates the anti-siphon feature without requiring a separate housing as used on prior sprinkler valve designs (i.e., if desired, the anti-siphon valve may be eliminated from the sprinkler valve and the passage to the cavity for the anti-siphon valve is sealed with cap 3A). An inlet port 4 is shown in FIG. 1. The inlet port is attached to a fluid source. Similarly, FIG. 1 shows an outlet port 5. The outlet port 5 is attached to the device or devices which use the fluid whose flow to the device or devices is controlled by the sprinkler valve. FIG. 1 shows a sediment sump 6 and sediment sump drain plug 6B. FIG. 1 also shows an electrically operated solenoid 7. The sediment sump is used to prevent sediment from accumulating in the solenoid circuit. FIG. 1 also shows a well-known manual flow control 8A. FIG. 1 shows that the solenoid 7 may be rotated clockwise in the direction of the arrow 8 from the automatic position (indicated by the letter "A" on the side of said solenoid 7) to the manual position (indicated by the letter "M" on the side of manual control 8A). This rotation of the solenoid would eliminate the need for the manual screw 8A. When the solenoid is in the manual position ("M") the valve is locked in the "ON" state and water always flows from inlet port 4 to outlet port 5 regardless of whether electrical current is applied to the solenoid. When the solenoid is in the automatic position ("A") the valve is in the "ON" state only when electrical current is applied to the solenoid. FIG. 1 shows the top of a diaphragm chamber 9 which top is a part of the upper body 1. FIG. 1 also shows a port plug 10.

In the embodiment shown in FIG. 1, for normal function there is no requirement for a solenoid plunger spring because fluid pressure accomplishes the function of keeping the sprinkler valve in the "OFF" state in which no fluid is flowing out of outlet port 5.

Figure 2:
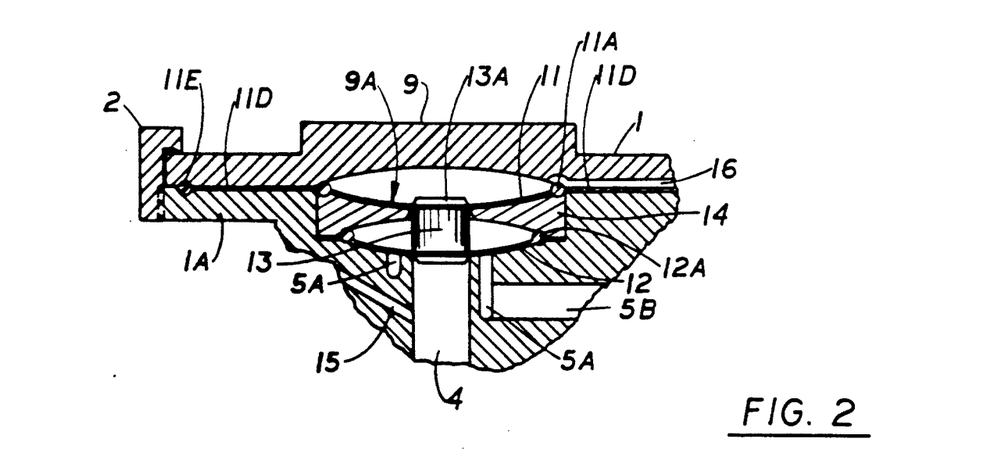
FIG. 2 shows a cross-sectional view of the sprinkler valve showing the diaphragm assembly.

FIG. 2 shows upper body lower body 1A, and screw-on clamp ring 2 which clamps the upper body 1 to the lower body 1A.

FIG. 2 also shows a typical low cost double diaphragm assembly 9A which fits inside of diaphragm assembly chamber 9. In FIG. 2, diaphragm 11 in the embodiment shown is also a portion of a seal or gasket 11D between the upper body 1 and the lower body 1A of FIG. 1. As shown in FIG. 2, gasket 11D (containing diaphragm 11) is molded with rigid spool 13, stop 13A, and lower diaphragm 12. The double diaphragm assembly consists of circular support ring 14, spool 13, stop 13A, Circular diaphragm 11 and circular diaphragm 12. Spool 13 and stop 13A are integrally molded with circular diaphragms 11 and 12. The diameter of diaphragm 11 is greater than the diameter of diaphragm 12.

The diaphragm assembly 9A is molded as shown cupped downward (center lower than circumference) to bias this assembly in a normally closed position (i.e., with inlet port 4 closed). Because the assembly is biased in the closed position low pressure leakage in the main circuit from inlet port 4 to outlet port 5 is avoided.

Circular support ring 14 supports and secures diaphragms 11 and 12 (i.e., assembly 9A) as they are positioned in the valve assembly. For ease of manufacture and assembly, circular support ring 14 may be made in the form of two mating halves. Beads 11A and 12A prevent the diaphragms 11 and 12, respectively, from pulling away from the ring 14. Stop 13A prevents the diaphragm from obstructing fluid flow in and out of passage 16. Stop 13A is molded as part of the diaphragm design.

FIG. 2 also shows inlet port 4 and annular passage 5A which connects inlet port 4 to fluid passage 5B.

With reference to FIG. 2, when the sprinkler valve is open (or in the "ON" state), fluid from inlet port 4 moves into an annular passage 5A and down to fluid passage 5B. Annular passage 5A is deep where it meets passage 5B and is as shallow as necessary to allow channel 15 to pass from inlet port 4 under passage 5A to sediment sump 6.

Because a differential diaphragm assembly is employed in a sprinkler valve constructed according to the invention described in this specification, there is no need with the invention described in this specification for a spring to close the valve.

Figure 3:
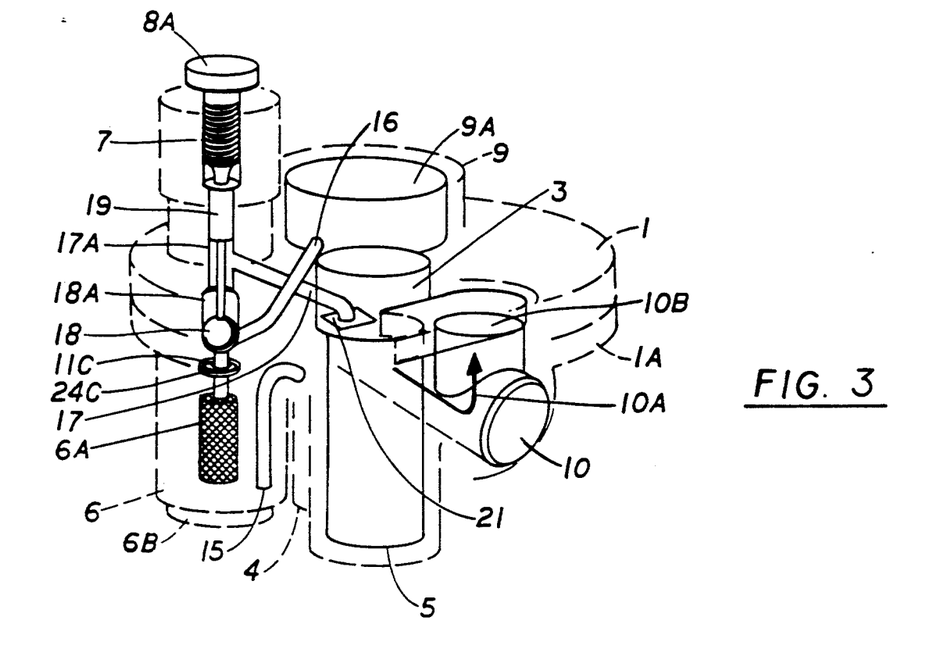
FIG. 3 shows a perspective view of the sprinkler valve showing some of the internal passages.

FIG. 3 shows a perspective view of some of the internal passages and solenoid parts of the sprinkler valve.

FIG. 3 shows upper body 1, lower body 1A, anti-siphon valve chamber 3, inlet port 4, outlet port 5, sediment sump 6, sediment strainer 6A, sediment sump drain plug 6B, and an electrically operated solenoid 7 with a well-known manual control 8A attached to the top of solenoid 7. FIG. 3 also shows diaphragm assembly 9A inside diaphragm assembly chamber 9.

Through the use of well-known molding techniques, lower body 1A of FIG. 3 may be manufactured without port plug 10. As shown, however, port plug 10 is used to direct fluid flow in the direction of arrow 10A to the vertical passage 10B (the fluid flow from inlet port 4 to outlet port 5 is discussed below with reference to FIG. 3A and FIG. 3B).

FIG. 3 shows passage 15 which carries fluid from inlet port 4 to sediment sump 6. (Passage 15 could also connect inlet port 4 directly to any point in the ball chamber below the lowest possible position of the bottom of the ball.) Fluid flows from sediment sump 6 into ball chamber 18A through hole 11C in gasket 11D (of FIG. 2) which hole 11C (in this embodiment) is at the bottom of ball chamber 18A. Ball 18 is shown in ball chamber 18A. Sealing bead 24C circumferentially seals hole 11C. Passage 16 carries fluid from ball chamber 18A to the top of diaphragm assembly chamber 9. Passage 17 carries fluid from narrow upper portion 17A of the ball chamber 18A to the outlet port 5. Sealing bead 24C prevents fluid leakage between upper body 1 and lower body 1A. The electrically controlled solenoid plunger 19 pushes ball 18 down to prevent fluid from entering chamber 18A from passage 15. Flapper valve 21 is molded into a three-sided flap which performs as a one-way flapper valve to prevent fluid from backing up from outlet port 5 into passage 17.

Figure 3A:
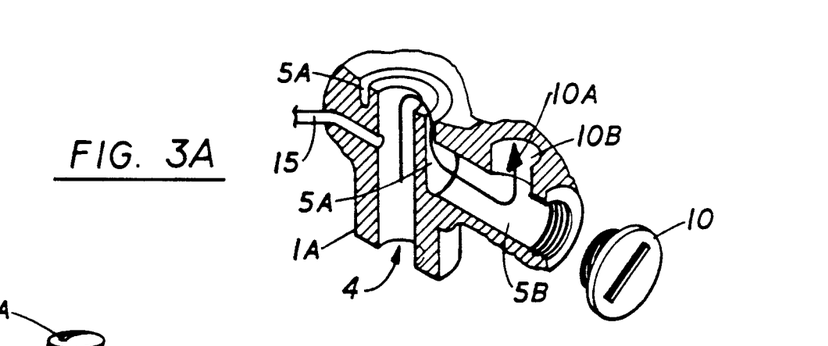
FIG. 3A shows a cutaway view of some of the fluid flow passages.
Figure 3B:
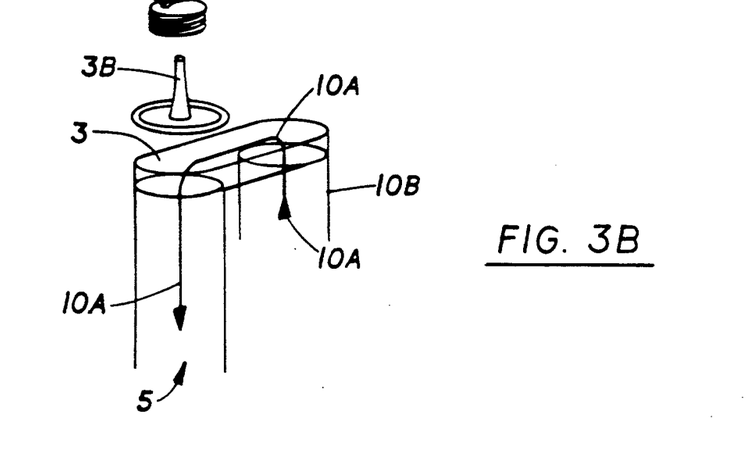
FIG. 3B shows a cutaway view of some additional fluid passages.

FIG. 3A shows fluid flows from inlet port 4 to annular passage 5A to passage 5B and then into passage 10B (the fluid flow out of passage 10B is shown in FIG. 3B). Port plug 10 functions to direct the fluid flow in the direction of arrow 10A from passage 5B into passage 10B. FIG. 3A also shows that fluid flows from inlet port 4 into passage 15.

FIG. 3B shows that fluid flows in the direction of arrow 10A from passage 10B through anti-siphon chamber 3 and into outlet port 5. FIG. 3B also shows anti-siphon valve chamber cap 3A and well-known anti-siphon valve 3B.

Figure 4:
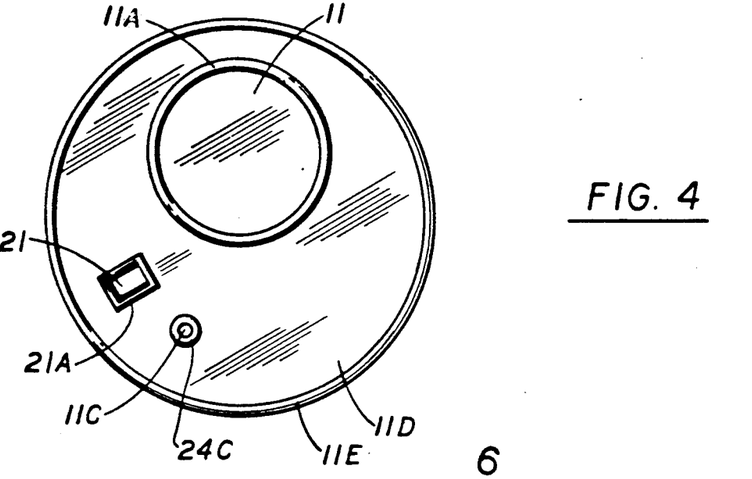
FIG. 4 shows a molded diaphragm and gasket which also incorporates a one-way valve.

FIG. 4 shows gasket 11D. FIG. 4 also shows the upper diaphragm 11 and its sealing bead 11A Sealing bead 11E circumferentially seals gasket 11D. Sealing bead 21A circumferentially seals flapper valve 21. Sealing bead 24C circumferentially seals hole 11C.

Figure 5:
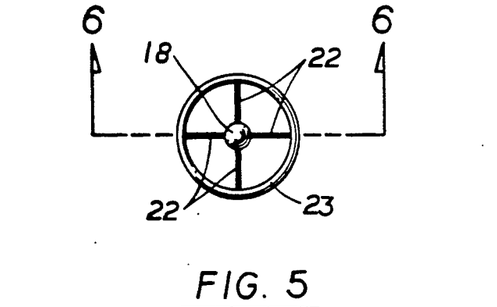
FIG. 5 shows the construction of the solenoid circuit flow control ball assembly.

FIG. 5 shows a low cost molded plastic ball 18 supported by radial spokes 22 in the center of circular ring seal 23. Radial spokes 22 create a suitable bias to keep the ball 18 normally blocking passage 17 (in the UP position in ball chamber 18A of FIG. 3, 7, and 8). Circular ring seal 23 is mounted horizontally and circumferentially in ball chamber 18A. The upward bias on ball 18 provided by radial spokes 22 prevents low pressure fluid flow through the solenoid circuit into passage 17 and then into the outlet port 5. When electrical current is applied to solenoid 7 of FIG. 3, solenoid plunger 19 pushes ball 18 down and opens the valve allowing fluid to flow from inlet port 4 to outlet port 5.

Figure 6:
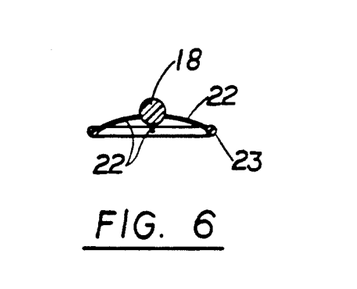
FIG. 6 shows a section view of the solenoid circuit flow control ball assembly of FIG. 5.

FIG. 6 shows that radial spokes 22 of circular ring seal 23 bias ball 18 above the plane defined by the circumference of ring seal 23. Thus, the bias created by the spokes 22 maintains ball 18 in the UP (or valve OFF) position in ball chamber 18A which blocks passage 17 and thereby prevents the flow of fluid to fluid outlet port 5.

Figure 6A:
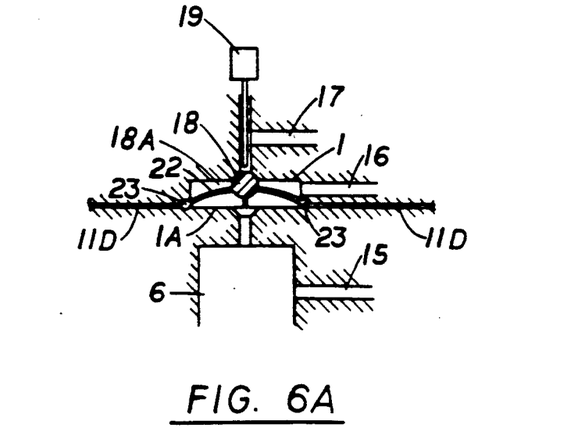
FIG. 6A shows a cross-section of the solenoid circuit flow control ball assembly mounted in the ball chamber.

FIG. 6A shows a cross-section of the ball 18 of FIG. 5 mounted in ball chamber 18A. FIG. 6A also shows upper body 1, lower body 1A, sediment sump 6, gasket 11D, passage 15, circular ring seal 23, radial spokes 22, passage 17, and solenoid plunger 19. FIG. 6A shows the upward bias on radial spokes 22 of ring seal 23 which keeps ball 18 blocking passage 17 when electrical current is not applied to the solenoid.

Figure 7:
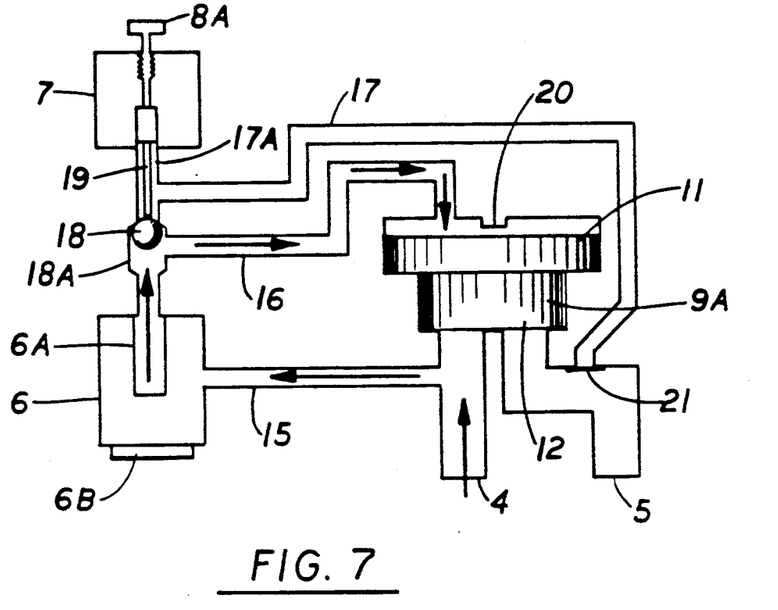
FIG. 7 is a schematic diagram of the sprinkler valve in the "OFF" state.
Figure 8:
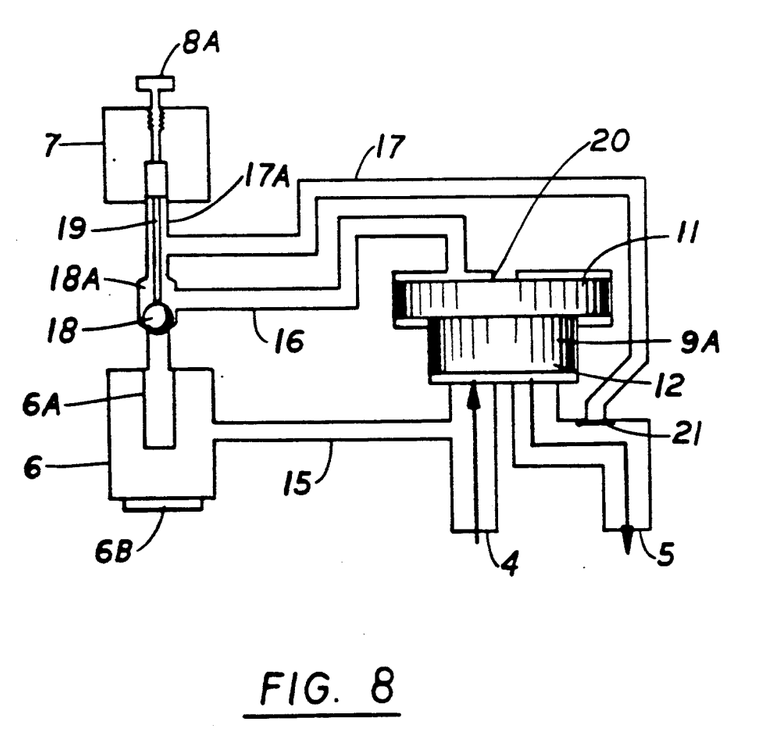
FIG. 8 is a schematic diagram showing the sprinkler valve in a steady state flow condition or "ON" state.

FIGS. 7 and 8 will be used to describe the operation of the valve. FIGS. 7 and 8 represent function and not necessarily the low cost construction of an actual valve. The double diaphragm assembly employed in the design in FIGS. 1, 2, and 3 has been changed to a double piston to facilitate the description of how the valve operates. Obviously, for one skilled in the art, a stepped piston can also be used by utilizing piston seals and a small bias spring which bias spring is equivalent to the bias provided by the downward cupping of diaphragm assembly 9A described above in conjunction with FIG. 2.

In the discussion of the valve's operation in conjunction with FIGS. 7 and 8 below, assume that the inlet pressure at inlet port 4 is normally in the range of 40 psi to 150 psi and that the pressure drop from inlet port 4 to outlet port 5 is minimal due to the construction of the ports and internal chambers.

The following description covers the normal operating condition in which the fluid pressure at inlet port 4 is equal to or greater than the fluid pressure at outlet port 5.

FIG. 7 shows the valve in the OFF position with ball 18 in the UP position in ball chamber 18A. FIG. 7 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 7 also shows piston assembly 9A (functionally equivalent to diaphragm assembly 9A of FIG. 2). FIG. 7 also shows flapper valve 21, passage 15 which connects inlet port 4 to sediment sump 6, passage 16 which connects ball chamber 18A to the top of piston 11, passage 17 which connects ball chamber 18A to outlet port 5, and narrow portion 17A of ball chamber 18A. FIG. 7 also shows the electrically controlled solenoid plunger 19 which pushes ball 18 down to prevent fluid from entering chamber 18A FIG. 7 also shows stop 20 (functionally equivalent to stop 13A of FIG. 2) which prevents the top of piston 11 from blocking passage 16.

In FIG. 7, the small area of the piston 12 has closed off the inlet port 4 and outlet port 5. This closing is accomplished by the fluid pressure from passage 15 which fluid exerts pressure on ball 18 located in ball chamber 18A. This fluid pressure forces ball 18 to the top of ball chamber 18A and blocks passage 17. This pressure is passed on from passage 16 to the upper larger area 11 of the piston. In FIG. 7, ports 4 and 5 will be closed because the area of piston 11 is larger than the area of piston 12.

To open the valve, as shown in FIG. 8, electrical current is applied to the solenoid coil 7 causing the plunger 19 to push the ball 18 downward in chamber 18A to block the flow of fluid from passage 15 and sump 6 from entering passage 16.

FIG. 8 shows the valve in the ON position with ball 18 in the DOWN position in ball chamber 18A.

FIG. 8 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 8 also shows piston assembly 9A (functionally equivalent to diaphragm assembly 9A of FIG. 2). FIG. 8 also shows flapper valve 21, passage 15 which connects inlet port 4 to sediment sump 6, passage 16 which connects ball chamber 18A to the top of piston passage 17 which connects ball chamber 18A to outlet port 5, and narrow portion 17A of ball chamber 18A. FIG. 8 also shows the electrically controlled solenoid plunger 19 which pushes ball 18 down to prevent fluid from entering chamber 18A. FIG. 8 also shows stop 20 (functionally equivalent to stop 13A of FIG. 2) which prevents the top of piston 11 from blocking passage 16.

FIG. 8 shows passage 16 connected to passage 17 which connection allows the fluid pressing on the upper area 11 of the piston to flow into passage 17 thus reducing the pressure on upper area 11 of the piston and thereby allowing the pressure exerted at inlet port 4 and transmitted to bottom area 12 of the piston to open the direct passage from inlet port 4 to outlet port 5.

Flapper valve 21 prevents fluid backup to upper area 11 of the piston (through passages 16 and 17) which backup could cause the valve to switch to the OFF position. This switching to the OFF state would occur (in the absence of the flapper valve) when the flow rate in a drip system is low enough to build sufficient back pressure to cause fluid flow back through the solenoid circuit.

The foregoing sets forth only one embodiment of the sprinkler valve.

For example, the sprinkler valve could be used with fluids other than water and for applications other than sprinkling a lawn with water. The sprinkler valve may be used in any application in which a low fluid flow rate and low fluid pressure are desired along with the ability to operate the valve with substantially higher flow rates and pressures. The fluid involved may be a liquid or a gas.

For example, the invention could be made without a gasket using only "O" ring seals where appropriate to seal between the upper body half and the lower body half.

By way of further example, neither diaphragm need be part of a gasket.

Figure 9:
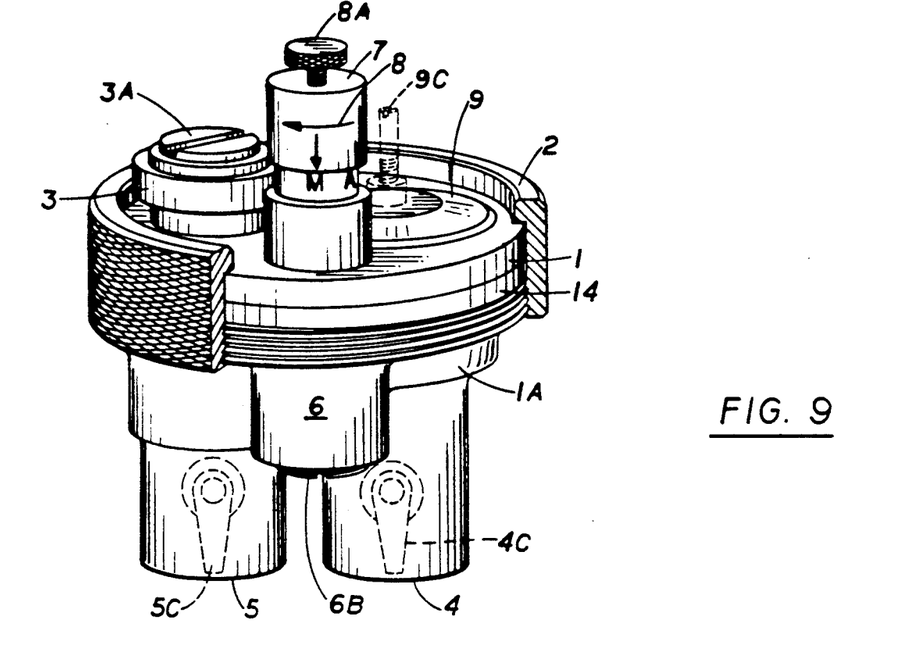
FIG. 9 shows a perspective view of a second embodiment of a sprinkler valve.

FIG. 9 shows a perspective view of a second embodiment of a sprinkler valve. This embodiment, though not limited in size or shape, shows an upper body shell 1, a lower body shell 1A, and a diaphragm support body 14 which is placed between upper body shell 1 and lower body shell 1A. Screw-on clamp ring 2 clamps the upper body shell 1 to the diaphragm support body 14 and the lower body shell 1A.

FIG. 9 shows a well-known anti-siphon valve chamber 3 can, if not required, be fitted with a cap 3A. Said cap 3A eliminates the anti-siphon feature without requiring a separate housing as used on prior sprinkler valve designs (i.e., if desired, the anti-siphon valve may be eliminated from the sprinkler valve and the passage to the cavity for the anti-siphon valve is sealed with cap 3A). An inlet port 4 is shown in FIG. 9. The inlet port 4 is attached to a fluid source. Similarly, FIG. 9 shows an outlet port 5. The outlet port 5 is attached to the device or devices which use the fluid whose flow to the device or devices is controlled by the sprinkler valve. FIG. 9 also shows that well-known flow control means such as flow restrictor 4C and flow restrictor 5C (shown in dotted lines) which may be incorporated in the inlet and/or outlet ports, respectively. For example, the flow restrictors 4C and 5C may prevent misting in a low flow drip system. Under certain circumstances, misting may result in the blow-out of one or more sprinkler heads connected to the outlet port 5 of the valve. The valve, as described in this embodiment, allows for placement of said flow controls to be added without distracting from the spirit of this invention. FIG. 9 shows a sediment sump 6 and sediment sump drain plug 6B. The sediment sump is used to prevent sediment from accumulating in the solenoid circuit.

FIG. 9 also shows an electrically operated solenoid 7. FIG. 9 also shows a well-known manual flow control 8A. FIG. 9 shows that the solenoid 7 may be rotated clockwise in the direction of the arrow 8 from the automatic position (indicated by the letter "A" on the side of said solenoid 7) to the manual position (indicated by the letter "M" on the side of manual control 8A). This rotation of the solenoid would eliminate the need for the manual screw 8A. When the solenoid is in the manual position ("M") the valve is locked in the "ON" state and water always flows from inlet port 4 to outlet port 5 regardless of whether electrical current is applied to the solenoid. When the solenoid is in the automatic position ("A") the valve is in the "ON" state only when electrical current is applied to the solenoid.

FIG. 9 shows the top of a diaphragm chamber 9 which top is a part of the upper body 1. Further, typical diaphragm adjusting means such as flow restrictor 9C may be incorporated to satisfy specific low flow requirements. Appropriate "O" rings or sealing means (as explained in FIGS. 11–14) are employed to insure fluid flows are contained in the appropriate channels.

In the embodiment shown in FIG. 9, there is no requirement for a solenoid plunger return spring because fluid pressure accomplishes the function of keeping the sprinkler valve in the "OFF" state in which no fluid is flowing out of outlet port 5.

Figure 10:
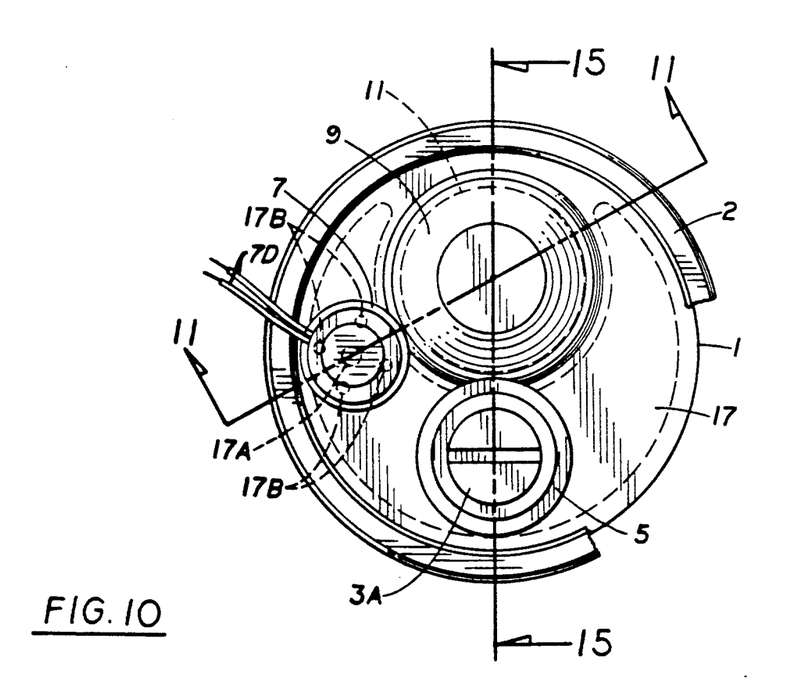
FIG. 10 shows a top view showing a dotted cavity in the underside of the upper body of a second embodiment of the valve.

FIG. 10 shows upper body 1, screw-on clamp ring 2, anti-siphon valve cap 3A, outlet port 5, solenoid 7, wires 7D connected to solenoid 7, and diaphragm chamber 9 of a second embodiment of a sprinkler valve. Note that clamping screws (rather than a clamping ring) around the periphery of the valve could be employed without departing from the meaning and spirit of the invention. FIG. 10 shows with a dotted line 11 a portion of the upper diaphragm. Fluid flow ports 17A, 17B, and passage 17 are shown partially with dotted lines. Fluid ports 17B are holes connecting passage 17A to passage 17. Fluid flows from the top of ball chamber 18A through passage 17A (which also accommodates the plunger 19) to circular passages 17B and then to passage 17. Fluid flows from passage 17 to outlet port 5.

Figures 11, 12, 13:
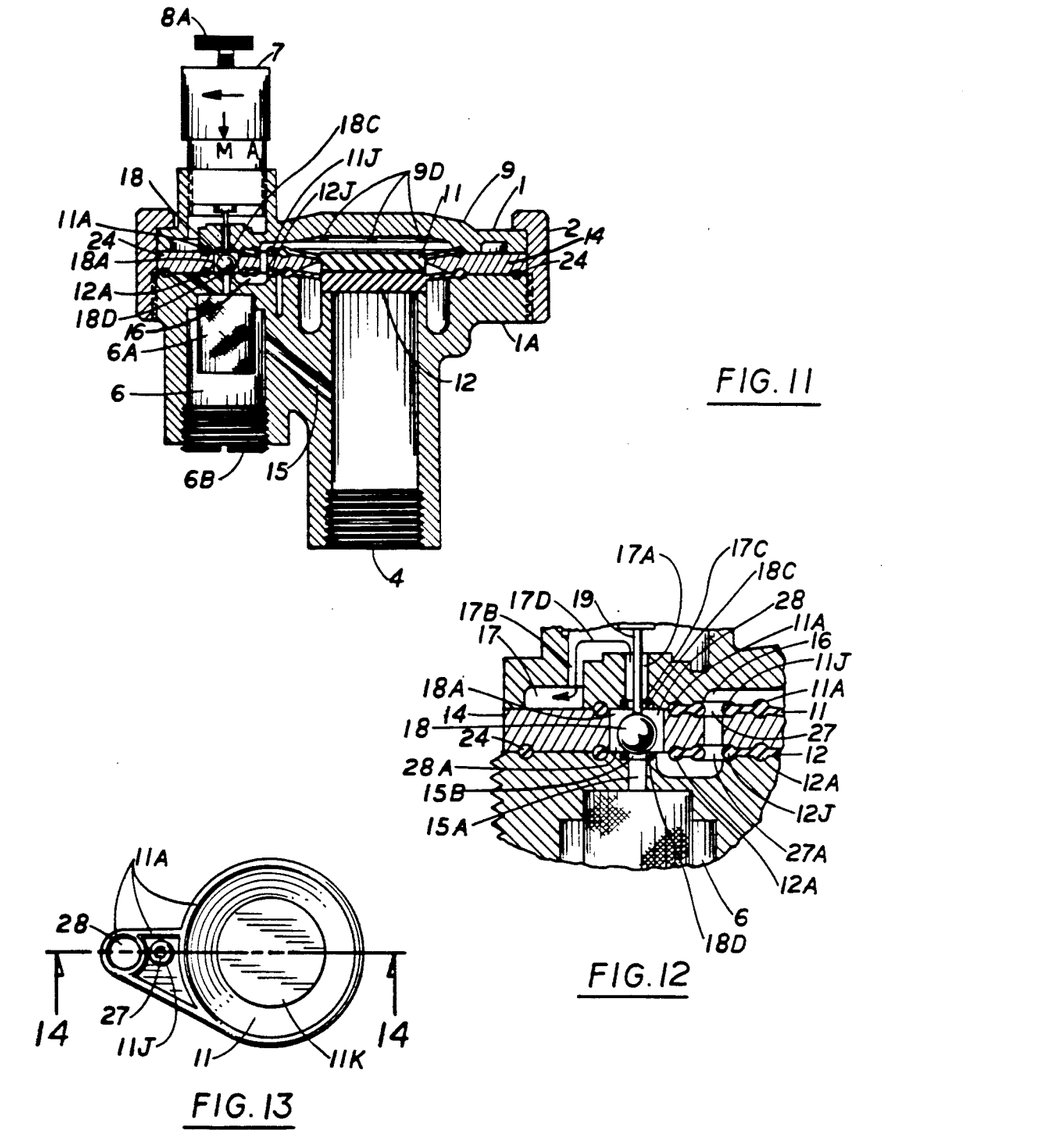
FIG. 11 shows a section view of a second embodiment of the valve through the diaphragms, solenoid assembly, and sump.
FIG. 12 shows an enlarged section view of the solenoid and the fluid flow passages of a second embodiment of the valve.
FIG. 13 shows a top view of a diaphragm of a second embodiment of the valve.

FIG. 11 shows a cross-sectional view of a second embodiment of a sprinkler valve along the line 11—11 of FIG. 10. FIG. 11 shows upper body lower body 1A, screw-on clamp ring 2, inlet port 4, sediment sump 6, sediment strainer 6A, sediment sump drain plug 6B, electrically operated solenoid 7 with a well-known manual control 8A attached to the top of solenoid 7, diaphragm chamber 9, upper diaphragm support protrusions 9D projecting downward from the inside surface of the upper portion of diaphragm chamber 9, upper diaphragm 11, sealing bead 11A on upper diaphragm 11, lower diaphragm 12, sealing bead 12A on lower diaphragm 12, diaphragm supporting body 14, passage 15 from inlet port 4 to sediment sump 6, passage 16 from the bottom of ball chamber 18A to the top of upper diaphragm 11, ball 18 in ball chamber 18A, upper ball seat 18C, lower ball seat 18D, and seal 24. FIG. 11 shows the upper diaphragm 11 18 and lower diaphragm 12 inside diaphragm chamber 9.

Passage 15 could also connect inlet port 4 to a point in the ball chamber below the lowest position of the bottom of the ball. Fluid flows from sediment sump 6 into ball chamber 18A. Fluid sealing means are accomplished by design of suitable sealing beads 11A and 11J on upper diaphragm 11 and sealing beads 12A and 12J on lower diaphragm 12 (see FIG. 12). A portion of the sealing beads 11A and 12A act further to seal the passages around the ball seats 18C and 18D as is shown in FIG. 12. Seal 24 prevents fluid from flowing from lower body 1A past the diaphragm support body 14 and/or to the outside of the valve. The operation of beads 11A and seal 24 is further explained below in FIG. 12 and the discussion of FIG. 12

As shown, the diaphragms are fully supported whether the valve is open or closed for reasons of minimizing stress on the flexible diaphragm materials. Lower diaphragm 12 rests on top of lower body 1A and below diaphragm supporting body 14. Upper diaphragm 11 rests on top of diaphragm supporting body 14 and below upper body For this embodiment, special flow characteristics are controlled by typical means as indicated by flow restrictors 4C and 5C of FIG. 9.

The upper diaphragm support protrusions 9D projecting downward from the inside (lower) surface of the upper portion of diaphragm chamber 9 serve to reduce stress on the upper diaphragm when the valve is fully opened and the upper diaphragm 11 is pushed toward the inside (lower) surface of the upper portion of diaphragm chamber 9.

FIG. 11 also shows that the surface area of lower diaphragm 12 exposed to fluid flowing into the valve through inlet port 4 is less than the surface area of upper diaphragm 11 exposed to fluid flowing from the ball chamber through passage 16 to the top of upper diaphragm 11. Thus, for constant fluid pressure, the valve will be closed when ball 18 is seated in the down position on lower ball seat 18D of ball chamber 18A.

Because the differential force on the diaphragms is employed in a sprinkler valve constructed according to the invention described in this specification, there is no need with the invention described in this specification for a spring to assist in the closing of the valve.

FIG. 12 shows a portion of the solenoid and ball chamber area enlarged to show fluid passages in the control circuit of a second embodiment of a valve. FIG. 12 shows sediment sump 6, upper diaphragm 11, sealing bead 11A on diaphragm 11, sealing bead 11J on diaphragm 11, lower diaphragm 12, sealing bead 12A on lower diaphragm 12, sealing bead 12J on lower diaphragm 12, diaphragm support body 14, passage 16 from ball chamber 18A to the top of upper diaphragm 11, ball 18 in ball chamber 18A, passage 15A from sump 6 to ball chamber 18A, opening 15B where passage 15A enters ball chamber 18A, passage 17A which extends from ball chamber 18A to the top of the upper body 1 (upper seat 18C where the ball 18 seats in the up position is located where passage 17A enters ball chamber 18A at opening 17C), one of circular passages 17B through which fluid flows from the upper portion of passage 17A to passage 17, a portion of passage 17 which (in its entirety) extends from the lower end of passage 17B to outlet port 5, arrow 17D, circular sealing bead 24 (an O-ring in this embodiment) which prevents fluid from flowing out of the sprinkler valve between lower body 1A and diaphragm support body 14, opening 27 in upper diaphragm 11 and opening 27A in lower diaphragm 12 (passage 16 passes through opening 27 in upper diaphragm 11 and through opening 27A in lower diaphragm 12), opening 28 in upper diaphragm 11 and opening 28A in lower diaphragm 12 (ball chamber 18A passes through opening 28 in upper diaphragm 11 and through opening 28A in lower diaphragm 12). Arrow 17D shows the direction of fluid flow from passage 17A to passage 17B to passage 17.

When the plunger pushes the ball 18 down (either due to electrical energy being supplied to solenoid 7 or due to the manual opening of the valve using manual control 8A (FIGS. 9 and 11), ball 18 is seated on lower ball seat 18D (FIG. 11). Then, the valve is open and fluid flows from inlet port 4 to outlet port 5.

When electricity to the solenoid is disconnected, fluid pressure raises the ball 18 so it seats on upper ball seat 18C (FIG. 11). Then, the valve is closed because the downward force generated by the fluid pressure on the surface area of upper diaphragm 11 is greater than the upward force generated by the fluid pressure on the lower diaphragm 12 (the surface area of upper diaphragm 11 is greater than the surface area of lower diaphragm 12).

FIG. 13 shows the diaphragm 11 as designed in this second embodiment of a valve. Two diaphragms are used in this embodiment. Two diaphragms of different sizes and shapes could also be employed without departing from the spirit of this invention so long as the surface area of the upper diaphragm exposed to the fluid whose flow is being regulated is greater than the surface area of the lower diaphragm exposed to the fluid whose flow is being regulated.

Figure 15:
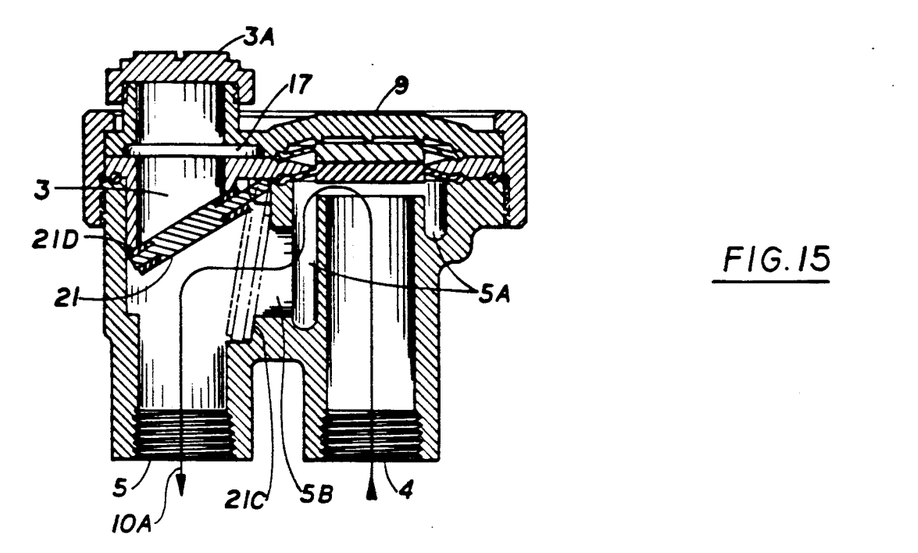
FIG. 15 shows a section view of the diaphragms and flapper valve of a second embodiment of the valve.

FIG. 13 shows diaphragm 11, sealing beads 11A and 11J, hub 11K, and opening 27 (surrounded by bead 11J) and opening 28 (surrounded by a portion of bead 11A). Passage 16 passes through opening 27 of upper diaphragm 11. Ball chamber 18A passes through opening 28 of upper diaphragm 11. Hub 11K on upper diaphragm and a similar hub (not shown) on lower diaphragm 12 serve to cooperate with and separate upper diaphragm 11 from lower diaphragm 12 when the diaphragms are used in tandem, as shown in FIGS. 11 and 15 and the discussion of FIGS. 11 and 15. A metal or other solid stiffening plate may be inserted in the middle of hub 11K. The surface area of lower diaphragm 12 exposed to fluid flowing into the valve through inlet port 4 is less than the surface area of the upper diaphragm which is exposed to fluid flowing from ball chamber 18A through passage 16 to the top of upper diaphragm 11.

Figure 14:
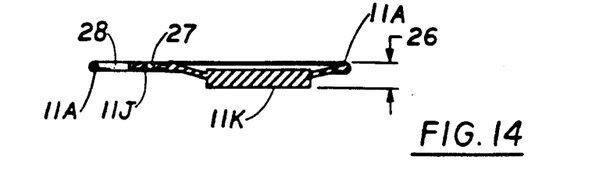
FIG. 14 shows a section view of a diaphragm of a second embodiment of the valve.

FIG. 14 is a section view of diaphragm 11 showing sealing bead 11A, hub 11K, opening 27 (surrounded by sealing bead 11J) and opening 28 (surrounded by a portion of sealing bead 11A) which sealing beads prevent fluid flow around each opening and the periphery of diaphragm of a second embodiment of a sprinkler valve. Dimension 26 shows that the lower surface of hub 11K is below bead 11A which creates a slight closing bias force when no inlet pressure is present.

FIG. 15 shows a cross section of a second embodiment of a valve taken along line 15—15 of FIG. 10. FIG. 15 shows anti-siphon valve chamber 3, anti-siphon valve cap 3A, inlet port 4, outlet port 5, annular passage 5A from inlet port 4 to passage 5B, passage 5B from annular passage 5A to outlet port 5, diaphragm chamber 9, arrow 10A showing the fluid path from inlet port 4 to outlet port 5, passage 17, flapper valve 21, flapper valve seat 21C, and flapper valve seat 21D.

Flapper valve 21 is used to prevent fluid back up from outlet port 5 into passage 17. The flapper valve 2 further serves as an anti-siphon valve in the event cap 3A is replaced with a flow-though cap (as discussed below in conjunction with FIGS. 17 and 18). When the flapper valve 21 is used as an anti-siphon valve, it drops to seat 21C to close off the inlet port 4 when the sprinkler valve is in the OFF state. The flapper valve 21 is seated on seat 21D to close off port 3 and passage 17 when the valve is in the ON state. Well-known anti-siphon valves operate in a similar manner.

FIG. 15 shows arrow 10A which shows the path of the fluid through the valve from inlet port 4 to annular passage 5A to passage 5B to outlet port 5.

Figure 16:
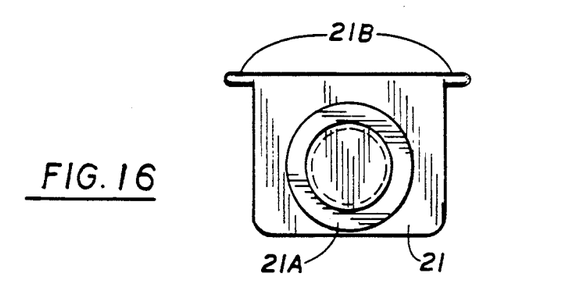
FIG. 16 shows a plan view of the flapper valve of a second embodiment of the valve.

FIG. 16 shows the flapper valve 21 in a second embodiment of a valve. FIG. 16 shows flapper valve 21, sealing beads 21A, and hinge pins 21B. Hinge pins 21B are employed to support and allow for rotation of the flapper valve. Seals 21A are provided on both sides of flapper valve 21 to seal passage 17 and port 3 when the valve is in the ON state (see FIG. 15). Seals 21A seal passage 5B when the valve is in the OFF state.

Figure 17:
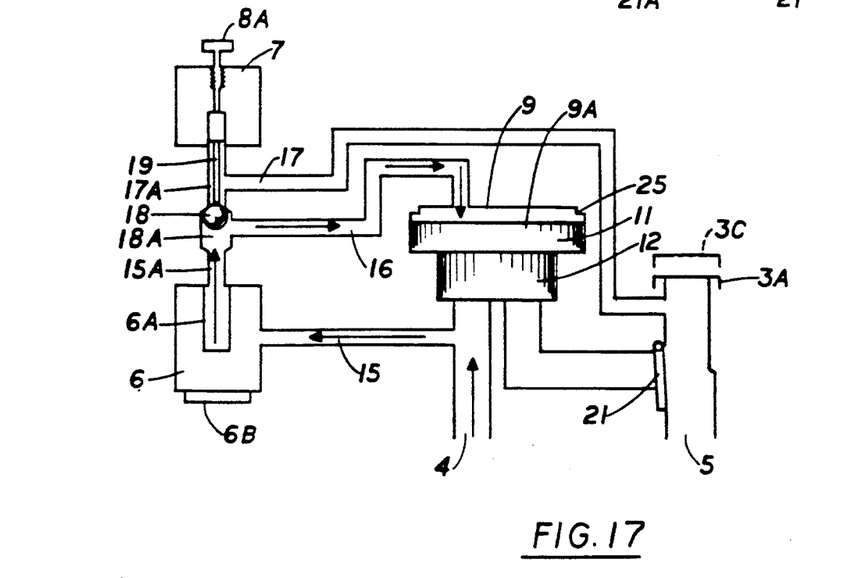
FIG. 17 is a schematic diagram showing a second embodiment of the valve in the "OFF" state.
Figure 18:
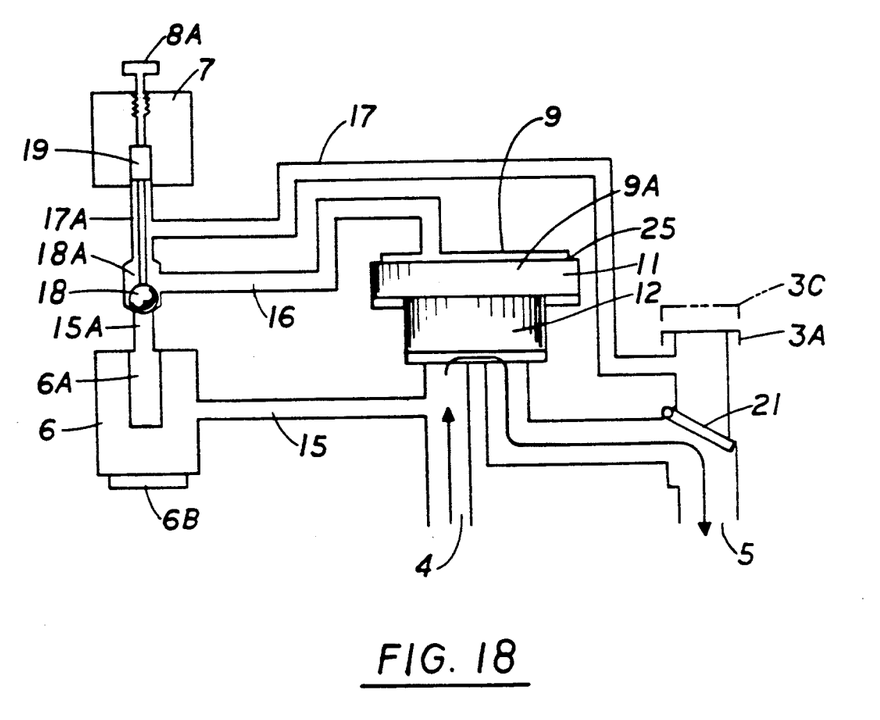
FIG. 18 is a schematic diagram showing a second embodiment of the valve in a steady state flow condition or "ON" state.

FIGS. 17 and 18 will be used to describe the operation of the second embodiment of a valve. FIGS. 17 and 18 represent function and not necessarily the low cost construction of an actual valve. The twin diaphragms employed in FIGS. 9–16 have been changed to a double piston to facilitate the description of how the valve operates. Obviously, for one skilled in the art, a stepped piston can also be used by utilizing piston seals and a small bias spring which bias spring is equivalent to the bias provided by the downward cupping of diaphragm dimension 26 in FIG. 14 described above and in conjunction with FIGS. 11, 12, and 15.

In the discussion of the valve's operation in conjunction with FIGS. 17 and 18 below, assume that the inlet pressure at inlet port 4 is in the range of 1 psi to 150 psi.

The following description covers the operating condition in which the fluid pressure at inlet port 4 is equal to or greater than the fluid pressure at outlet port 5.

FIG. 17 shows the valve in the OFF position with ball 18 in the UP position in ball chamber 18A. FIG. 17 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 17 also shows piston assembly 9A (functionally equivalent to the twin diaphragms 11 and 12 of FIG. 11) in piston chamber 9, upper piston surface 11, lower piston surface 12, and step 25 which prevents upper piston surface 11 from contacting the top of piston chamber 9. FIG. 17 also shows flapper valve 21, passage 15 which connects inlet port 4 to sediment sump 6, passage 15A which connects sediment sump 6 to ball chamber 18A, passage 16 which connects ball chamber 18A to the top of upper piston surface 11, passage 17 which connects ball chamber 18A to outlet port 5, and narrow portion 17A of ball chamber 18A. Passage 17 has sufficient capacity to hold the fluid expelled, when the valve turns ON, from the top of the upper diaphragm (see the dotted lines in FIG. 10). FIG. 17 also shows the electrically controlled solenoid plunger 19 which pushes ball 18 down to prevent fluid from entering chamber 18A. FIG. 17 also shows step 25 which prevents the top of upper piston surface 11 from blocking passage 16.

In FIG. 17, the smaller lower surface 12 of the piston assembly 9A has closed off the inlet port 4 and outlet port 5. This closing is accomplished by the fluid pressure from passage 15A which fluid exerts pressure on ball 18 located in ball chamber 18A. This fluid pressure forces ball 18 to the top of ball chamber 18A and blocks passage 17. This pressure is passed on from passage 16 to the upper larger area 11 of the piston. In FIG. 17, ports 4 and 5 will be closed because the upper area of piston 11 is larger than the lower smaller area 12 of the piston. FIG. 17 shows cap 3A which is solid or closed and is used in conjunction with a valve with no anti-siphon feature. FIG. 17 also shows cap 3C which is partially open and which is used in conjunction with valves which incorporate an anti-siphon feature.

To open the valve, as shown in FIG. 18, electrical current is applied to the solenoid coil 7 causing the plunger 19 to push the ball 18 downward in chamber 18A to block the flow of fluid from passage 15A and sump 6 from entering passage 16.

FIG. 18 shows the valve in the ON position with ball 18 in the DOWN position in ball chamber 18A.

FIG. 18 shows inlet port 4, outlet port 5, sediment sump 6, sediment strainer 6A, sediment drain plug 6B, an electrically operated solenoid 7 and a well-known manual control 8A which may be attached to the top of solenoid 7. FIG. 18 also shows piston assembly 9A (functionally equivalent to the two diaphragms 11 and 12 of FIG. 11) in piston chamber 9. FIG. 18 also shows flapper valve 21, passage 15 which connects inlet port 4 to sediment sump 6, passage 15A which connects sediment sump 6 to ball chamber 18A, passage 16 which connects ball chamber 18A to the top of piston 11, passage 17 which connects ball chamber 18A to outlet port 5, and narrow portion 17A of ball chamber 18A. FIG. 18 also shows step 25 which prevents the upper surface area of piston assembly 9A from blocking passage 16.

FIG. 18 shows passage 16 connected to passage 17 which connection allows the fluid pressing on the upper area 11 of the piston to flow into passage 17 thus reducing the pressure on the upper area 11 of the piston and thereby allowing the pressure exerted at inlet port 4 and transmitted to the bottom area 12 of the piston to open the direct passage from inlet port 4 to outlet port 5. FIG. 18 also shows cap 3A and cap 3C as described in FIG. 17.

Flapper valve 21 prevents fluid backup to the upper area of the piston 11 (through passages 16 and 17) which backup could cause the valve to switch to the OFF position. This switching to the OFF state would occur (in the absence of the flapper valve) when the flow rate in a drip system is low enough to build sufficient back pressure to cause fluid flow back through passages 16 and 17 to piston chamber 9 which would close the valve.

As described above, no springs to assist in closing the valve are required for this invention. The difference in effective operating areas between the two diaphragms (larger area on top) insures that when pressure is applied to the top of the upper diaphragm, the resulting force overcomes equal pressure per unit area on the lower side of the lower diaphragm. Further, unlike other sprinkler valves, no solenoid plunger return springs are required. To accomplish this, three factors are considered for sizing of the flow areas in and out of the solenoid circuit (see FIG. 12 and the discussion of FIG. 12). These three factors are the cross-sectional area of port 15B, the cross-sectional area of port 17C, and the cross-sectional area of ball chamber 18A and ball 18. First, port 17C is sized to minimize the electrical energy to the solenoid 7. Second port 17C is sized to be effectively larger than the difference between the cross-sectional area of the chamber 18A minus the cross-sectional area of ball 18. This sizing of port 17C prevents pressure build-up above the ball 18 which pressure build-up would prevent the ball 18 from rising in the ball chamber 18A. Finally, the cross-sectional area of port 15B is sized to be larger than the difference between the cross-sectional area of ball chamber 18A minus the cross-sectional area of ball 18. This sizing of port 15B creates a positive force to raise the ball 18 up and seat the ball 18 at seat 18C.

In summary, note that the sizing of ports 15B and 17C are large enough to create a positive pressure to raise ball 18 to seat against upper seat 18C. One embodiment of this invention functions with the following dimensions:

1. Port 15B is 0.060 inches in diameter.
2. Port 17C is 0.060 inches in diameter.
3. Ball chamber 18A has an inner diameter of 0.19 inches.
4. Ball 18 has a diameter of 0.187 inches.

In an embodiment with these dimensions, the ball and plunger weight is raised to seat at upper seat 18C at an inlet fluid pressure of 5 psi. The electrical energy produced by 0.26 amperes and 24 volts at a frequency of 60 hertz is sufficient to open the valve at 150 psi of inlet fluid pressure.

The foregoing sets forth only several embodiments of the sprinkler valve.

It is to be understood that while the various aspects of the invention have been described above with respect to their preferred embodiments other embodiments within the scope and spirit of this invention are possible.

For example, the sprinkler valve could be used with fluids other than water and for applications other than sprinkling a lawn with water. The sprinkler valve may be used in any application in which a low fluid flow rate and low fluid pressure are desired along with the ability to operate the valve with substantially higher flow rates and pressures. The fluid involved may be a liquid or a gas.

The upper and lower diaphragms could be of different sizes. The upper and lower diaphragms could be non-identical and/or made of different materials.

The fluid flow blocking means could be in the form of a disk, a cylinder, a cube, a diamond shaped solid, or some other non-spherical form and any of these forms could be directly and permanently connected to the solenoid plunger rather than being separate from the solenoid plunger.

The diaphragm hubs could be of different sizes and made of different materials. The diaphragms could be made without hubs. The valve itself could be non-circular in shape. The various internal passages could be non-circular in cross-section.

The valve can be made and operated without flow restrictors. For example, the fluid on top of the upper diaphragm could vent directly to the atmosphere without going through the outlet port. If the fluid on top of the upper diaphragm vented directly to the atmosphere, there would be no need for a flapper valve.

The description and examples are intended to illustrate and not limit the scope of the invention which is defined by the full scope of the appended claims and which invention is entitled to protection within the full scope of the appended claims.

What is claimed is:

1. A diaphragm assembly for use in a sprinkler valve with an inlet port, an outlet port, a flapper valve, a fluid flow blocking means in a fluid flow blocking means chamber, a solenoid connected to a solenoid plunger which solenoid plunger may contact the fluid flow blocking means, a gasket, a passageway connecting the outlet port to the fluid flow blocking means chamber, a passageway connecting the inlet port to the fluid flow blocking means chamber, and a passageway connecting a top surface of an upper diaphragm of the diaphragm assembly to the fluid flow blocking means chamber which diaphragm assembly comprises a support ring in which are concentrically mounted a spool, a stop on top of the spool, the upper diaphragm beneath the stop and around the spool, and a lower diaphragm beneath the upper diaphragm and around the spool, and in which the surface area of the upper diaphragm is greater than the surface area of the lower diaphragm and in which sprinkler valve the upper diaphragm is part of the gasket and in which sprinkler valve the flapper valve is located in such a manner that fluid flow from the outlet port of the sprinkler valve in the direction of the fluid flow blocking means chamber closes the flapper valve and stops fluid from flowing from the outlet port to the passageway from the outlet port to the fluid flow blocking means chamber and which flapper valve is located in such a manner that fluid pressure at the outlet port is not applied to the top of the upper diaphragm and which sprinkler valve is controlled by application of fluid pressure at the inlet port of the valve to the diaphragms.

2. A diaphragm assembly for use in a sprinkler valve with an inlet port, an outlet port, a flapper valve, a fluid flow blocking means in a fluid flow blocking means chamber, a solenoid connected to a solenoid plunger which solenoid plunger may contact the fluid flow blocking means in the fluid flow blocking means chamber, a passageway connecting the outlet port to the fluid flow blocking means chamber, a passageway connecting the inlet port to the fluid flow blocking means chamber, and a passageway connecting a top surface of an upper diaphragm of the diaphragm assembly to the fluid flow blocking means chamber which diaphragm assembly comprises a support ring in which are concentrically mounted a spool, a stop on top of the spool, an upper diaphragm beneath the stop and around the spool, and a lower diaphragm beneath the upper diaphragm and around the spool, and in which the surface area of the upper diaphragm is greater than the surface area of the lower diaphragm and in which sprinkler valve the flapper valve is attached in such a manner that fluid flow from the outlet port of the sprinkler valve in the direction of the fluid flow blocking means chamber closes the flapper valve and stops fluid from flowing from the outlet port to the passageway from the outlet port to the fluid flow blocking means chamber and which flapper valve is attached in such a manner that fluid pressure at the outlet port is not applied to the top of the upper diaphragm and which sprinkler valve is controlled by application of fluid pressure at the inlet port of the valve to the diaphragms.

3. A sprinkler valve for controlling fluid flow comprising:
   a shell,
   a plurality of chambers in the shell,
   an inlet port,
   an outlet port,
   an upper diaphragm and a lower diaphragm,
   a passageway connecting the inlet port to the bottom of the lower diaphragm,
   a plurality of passageways connecting the inlet port to the top of the upper diaphragm and the top of the upper diaphragm to the outlet port,
   a passageway connecting the bottom of the lower diaphragm to the outlet port,
   a solenoid operably connected to a fluid flow blocking means which fluid flow blocking means in a first position blocks fluid flow from the top of the upper diaphragm to the outlet port and which fluid flow blocking means in a second position blocks fluid flow from the inlet port to the top of the upper diaphragm and which fluid flow blocking means is returned from the second position to the first position solely by the fluid pressure at the inlet port, a means for activating the sprinkler valve without connecting electrical current to the solenoid, a means for preventing fluid from flowing from the outlet port into the first of the plurality of passageways connecting the outlet port to the top of the upper diaphragm and for preventing fluid pressure at the outlet port from being applied to the top of the upper diaphragm, and a means for allowing only momentary fluid flow from on top of the upper diaphragm toward the outlet port.

4. A sprinkler valve as in claim 3 in which the plurality of chambers includes a fluid flow blocking means chamber and a diaphragm chamber.

5. A sprinkler valve as in claim 3 wherein the upper diaphragm and the lower diaphragm are of different sizes.

6. A sprinkler valve as in claim 3 where the solenoid plunger is only exposed to atmospheric pressure.

7. A sprinkler valve as in claim 3 in which the means for preventing fluid from flowing from the outlet port into the first of the plurality of passageways connecting the outlet port to the top of the upper diaphragm and for preventing fluid pressure at the outlet port from being applied to the top of the upper diaphragm includes a flapper valve.

8. A sprinkler valve as in claim 7 in which the flapper valve includes a flap on a pivot which flap is in a first position in which the flap seals an anti-siphon port when fluid is flowing from the inlet port to the outlet port and which flap is in a second position in which the flap stops fluid flow from an outlet port into the first of the passageways connecting the outlet port to the top of the upper diaphragm when fluid is not flowing from the inlet port to the outlet port.

9. A sprinkler valve as in claim 3 in which a rigid valve body member supports both diaphragms.

10. A sprinkler valve for controlling fluid flow comprising:

a shell, a plurality of chambers in the shell, an inlet port, an outlet port, a stepped piston with an upper surface and a lower surface, a passageway connecting the inlet port to the bottom of the lower surface of the stepped piston, a plurality of passageways connecting the inlet port to the top of the upper surface of the stepped piston and the top of the upper surface of the stepped piston to the outlet port, a passageway connecting the bottom of the lower surface of the stepped piston to the outlet port, a solenoid operably connected to a fluid flow blocking means which fluid flow blocking means in a first position blocks fluid flow from the top of the upper surface of the stepped piston to the outlet port and which fluid flow blocking means in a second position blocks fluid flow from the inlet port to the top of the upper surface of the stepped piston and which fluid flow blocking means is returned from the second position to the first position solely by the fluid pressure at the inlet port, a means for activating the sprinkler valve without connecting electrical current to the solenoid, a means for preventing fluid from flowing from the outlet port into the first of the plurality of passageways connecting the outlet port to the top of the upper surface of the stepped piston and for preventing fluid pressure at the outlet port from being applied to the top of the upper surface of the stepped piston, and a means for allowing only momentary fluid flow from on top of the upper surface of the stepped piston toward the outlet port.

11. A sprinkler valve for controlling fluid flow comprising:

a shell, a plurality of chambers in the shell, an inlet port, an outlet port, an upper diaphragm and a lower diaphragm, a passageway connecting the inlet port to the bottom of the lower diaphragm, a plurality of passageways connecting the inlet port to the top of the upper diaphragm and the top of the upper diaphragm to the atmosphere, a passageway connecting the bottom of the lower diaphragm to the outlet port, and a solenoid operably connected to a fluid flow blocking means which fluid flow blocking means in a first position blocks fluid flow from the top of the upper diaphragm to the atmosphere and which fluid flow blocking means in a second position blocks fluid flow from the inlet port to the top of the upper diaphragm and which fluid flow blocking means is returned from the second position to the first position solely by the fluid pressure at the inlet port.

* * * * *